United States Patent [19]

Ito et al.

[11] 4,370,856

[45] Feb. 1, 1983

[54] CONTROL METHOD FOR WINCH OF MINING MACHINERY

[75] Inventors: Keishi Ito; Ryuji Yamada, both of Oomuta, Japan

[73] Assignee: Kabushiki Kaisha Mitsui Miike Seisakusho, Tokyo, Japan

[21] Appl. No.: 177,400

[22] Filed: Aug. 12, 1980

[30] Foreign Application Priority Data

Aug. 24, 1979 [JP] Japan .................. 54-107075

[51] Int. Cl.³ .................................. F15B 7/00
[52] U.S. Cl. .................................. 60/389; 60/390; 60/444; 254/361; 318/603
[58] Field of Search ............... 60/327, 389, 390, 395, 60/443, 444, DIG. 2; 254/361; 318/603

[56] References Cited

U.S. PATENT DOCUMENTS

| | | | |
|---|---|---|---|
| 2,864,239 | 12/1958 | Taylor | 60/390 |
| 3,571,685 | 3/1971 | Akins et al. | 318/603 |
| 3,667,225 | 6/1972 | Karman | 60/390 |
| 3,901,031 | 8/1975 | Knapp et al. | 60/444 X |
| 4,052,646 | 10/1977 | Massey et al. | 318/603 X |
| 4,109,799 | 8/1978 | Munn | 254/361 X |
| 4,131,838 | 12/1978 | Etoh et al. | 318/603 |
| 4,259,626 | 3/1981 | Nomura et al. | 18/603 X |

*Primary Examiner*—Gerald A. Michalsky
*Attorney, Agent, or Firm*—George B. Oujevolk

[57] ABSTRACT

An arrangement is described for controlling a winch used in mining machinery, wherein the direction of operating a winch and speed thereof are controlled by changing the position of a control element of a fluid pump for supplying a fluid into a fluid pressure recirculating circuit, by a device incorporating the fluid pressure recirculating circuit and a control circuit. The arrangement is characterized by feeding ON/OFF signals for giving instructions of a position to a control element, by a bi-polar pulse generator. Pulse from the bi-polar pulse generator are fed to a reversible BCD counter by pressing push buttons, and comparing a voltage generated via a D/A converting circuit from the reversible BCD counter with a voltage generated from a potentiometer coupled to the control element according to the position of the control element to be selected, thereby controlling the instruction of the position of the control element; and setting a speed of the winch by pressing the push buttons.

2 Claims, 7 Drawing Figures

CONTROL METHOD FOR WINCH OF MINING MACHINERY

BACKGROUND OF THE INVENTION

1. Field of the Invention

This invention relates to a method for controlling a winch of a mining machinery, such as a coal mining machine, an excavator or an ore carrier machine.

2. Description of the Prior Art

Generally speaking, the direction and speed of movement of a winch of a piece of mining machinery are controlled by the position of a controlling element of a fluid pump for supplying fluid (for example a liquid) into a working fluid pressure recirculating circuit. The position of the controlling element is controlled by an electromagnetic change-over valve by way of a fluid pressure cylinder connected to a fluid pressure control circuit. The electromagnetic change-over valve is operated by a push button switch connected to a control cable or a wireless push button switch.

For example, if a push button for operating a winch in the rightward moving mode, which is provided in a winch control device of a mining machinery is pressed, then an electromagnetic change-over valve for moving a winch to the right is excited, thereby operating the fluid pressure cylinder device in a direction to operate the winch to the right. Consequently, the controlling element of the fluid pump assumes a position to move the winch to the right, so that the winch starts moving to the right. If the push button is further pressed, the fluid pressure cylinder device continues to operate, thereby shifting the controlling element to a position in the high speed region, whereby the speed of the winch is increased. In short, the speed of the winch is controlled by the duration of which the push button is being pressed. Such a controlling method, however, has a drawback in that, because of the effect of the inertia of a winch device and the mining machinery itself and the slackening of the chain engaging the winch, an interval of time is introduced between the operation of a control system and the operation of the mining machinery itself. Furthermore, in a dark place in which feeble lights are lit, such as in the pit, an operator must continuously press the push button while watching by one's eyes the running conditions of the mining machinery, and it is difficult to control the winch so that the winch may be operated at a predetermined speed for the time during which the push button is being pressed.

SUMMARY OF THE INVENTION

It is a primary object of the present invention to provide a winch controlling method, in which the speed of winch of mining machinery is controlled by the frequency of pressing a push button.

It is a second object of the present invention to provide a winch controlling method for mining machinery, wherein the direction of movement of a winch and the speed of the winch are determined by the frequency of the pressing direction and the speed setting of push buttons, so that the winch can be operated in a desired direction at a desired speed even in a dark place where there are only feeble lights, thereby ensuring the safety of an operator, relieving the burden imposed on the operator, and enhancing the efficiency of mining work.

It is a third object of the present invention to provide a winch controlling method, wherein the direction and a speed of movement of the winch of the mining machinery are controlled by operating push buttons of a radio-transmitter at a remote place.

These and other objects and features of the present invention will be apparent from the following specification with reference to the accompanying drawings which indicate a preferred embodiment of the invention.

DESCRIPTION OF THE PREFERRED EMBODIMENTS

Figure 1:
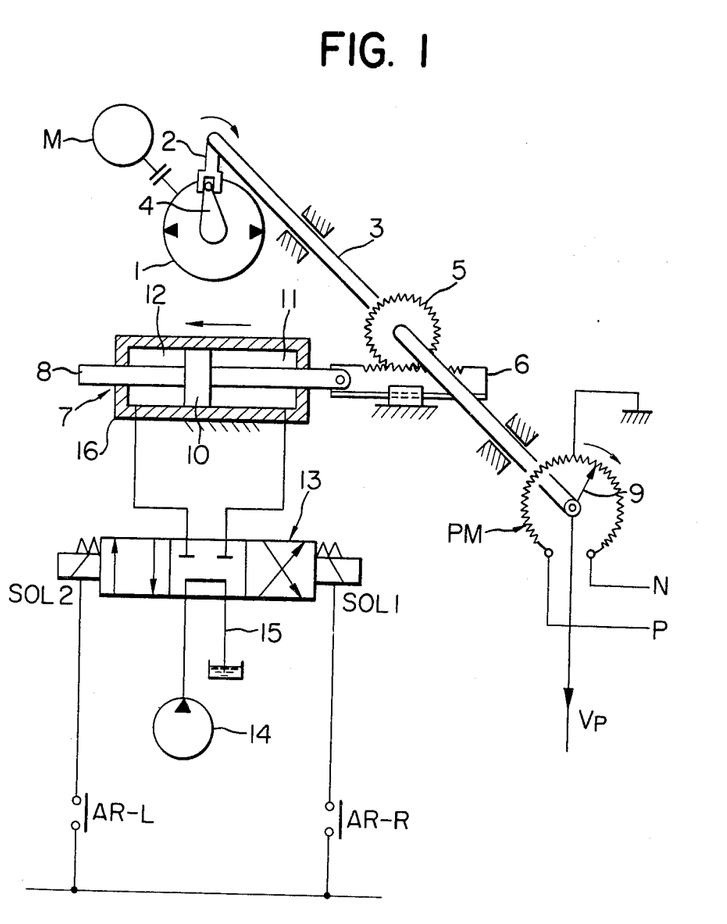
FIG. 1 diagrammatically shows a fluid pressure control circuit and a control mechanism which are employed according to the present invention.

A fluid pump (for example, a liquid pump) for supplying a fluid (for example, a liquid) into a fluid pressure recirculating circuit (main hydraulic circuit) for operating a winch is driven by an electric motor M. A discharge rate of the fluid pump 1 is controlled by an adjusting lever 4 of the pump which is operated by a controlling element 2 attached to one end of a control shaft 3.

A pinion 5 is mounted on the control shaft 3 at the mid point thereof and maintained in mesh with a rack 6 slidably supported. The rack 6 is pin-connected at one end to a piston rod 8 of a reciprocating type fluid pressure cylinder device 7. A sliding element 9 of a potentiometer PM is attached through the medium of an electrically insulating material to the other end of the control shaft 3. The opposite terminals of the potentiometer PM are connected to power sources N and P, and a mid point of the potentiometer is grounded, so that a positive or negative position-voltage Vp appears at the sliding element 9.

Right and left fluid chambers 11 and 12 defined by a piston 10 in the fluid pressure cylinder device 7 are connected by way of an electromagnetic change-over valve 13 to a discharge port of a fluid pump 14 for fluid pressure controlling circuit and a discharge pipe 15 thereof, respectively, so that a fluid from the fluid pump 14 is fed by way of the electromagnetic change-over valve 13 to one of the fluid chambers, thereby moving the rack 6 in one direction, whereby the controlling element 2 is turned in one direction by way of the pinion 5 and the control shaft 3.

The electromagnetic change-over valve 13 has solenoids SOL-1 and SOL-2 which are excited by contacts AR-R and AR-L of a relay. For example, when the contact AR-R is turned on to excite the solenoid SOL- 1, then the fluid from the fluid pump 14 is introduced into the right fluid chamber 11 in the cylinder 16, thereby moving the piston 10 to the left (a direction of arrow in FIG. 1), whereas the control element 2 and the sliding element 9 are turned clockwise by way of the piston rod 8, the rack 6, the pinion 5 and the control shaft 3, whereby the fluid pump 1 moves the winch to the right and the sliding element 9 generates a position voltage Vp.

Figure 2:
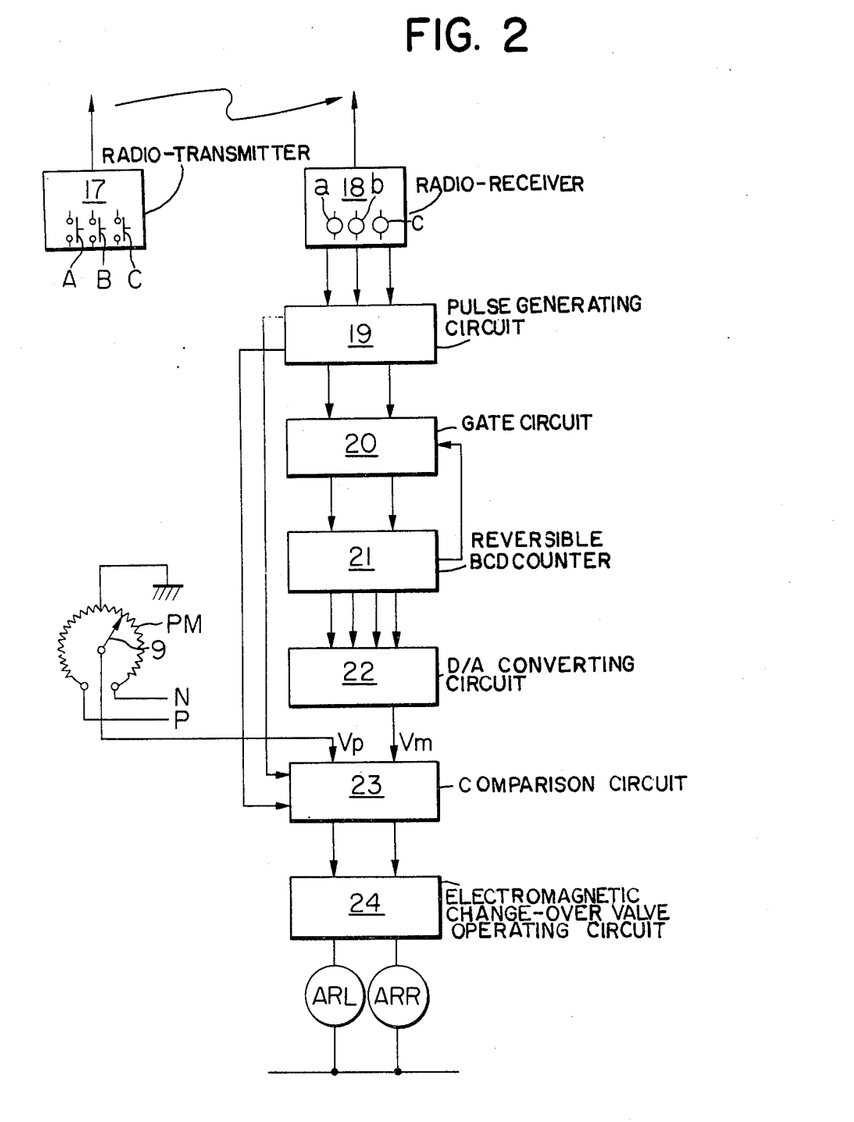
FIG. 2 is a block diagram of an electric control circuit.

FIG. 2 is a block diagram of an electric control circuit for operating the electromagnetic change-over valve 13, wherein an instruction of a position of the control element (hereinafter referred to as a control-element-position instruction) is given by wireless transmitter and receiver.

A radio-transmitter 17 has a push button switch A for operating the winch to the right (hereinafter referred to as "rightward steering mode"), a push button switch B for operating the winch to the left (hereinafter referred to as "leftward steering mode") and a switch button C for stopping the winch. When any of these bottons is pressed, an instruction is given for moving the control element 2 to a position for operating the winch in the rightward steering mode, to a position for operating the winch in the leftward steering mode, or to a position for stopping the winch. The radio-receiver 18 with relays a,b and c is responsive to the instruction from the radio-transmitter 17. The radio-transmitter 17 and the radio-receiver 18 respectively have several push buttons and relays other than described above, but no further description is given thereto because these have no relation to the present invention.

A bi-polar pulse generating circuit (reversible pulse generating logic circuit) 19 feeds ON/OFF signals to the relays a and b, and a stop signal to the relay c, and the reversible BCD (Binary Coded Decimal) counter 21 counts pulse signal generated from the bi-polar pulse generating circuit 19 and passing through the gate circuit 20. The D/A (Digital/Analog) converting circuit 32 converts the number of pulses counted by the reversible BCD counter 21 into an instruction voltage Vm. The instruction voltage Vm, the position voltage Vp and a direction signal are fed to a comparison circuit 23. The electromagnetic change-over valve operating circuit 24 controls relays ARR and ARL for operating the electromagnetic change-over valve 13, according to an output from the comparison circuit 23.

Figure 3:
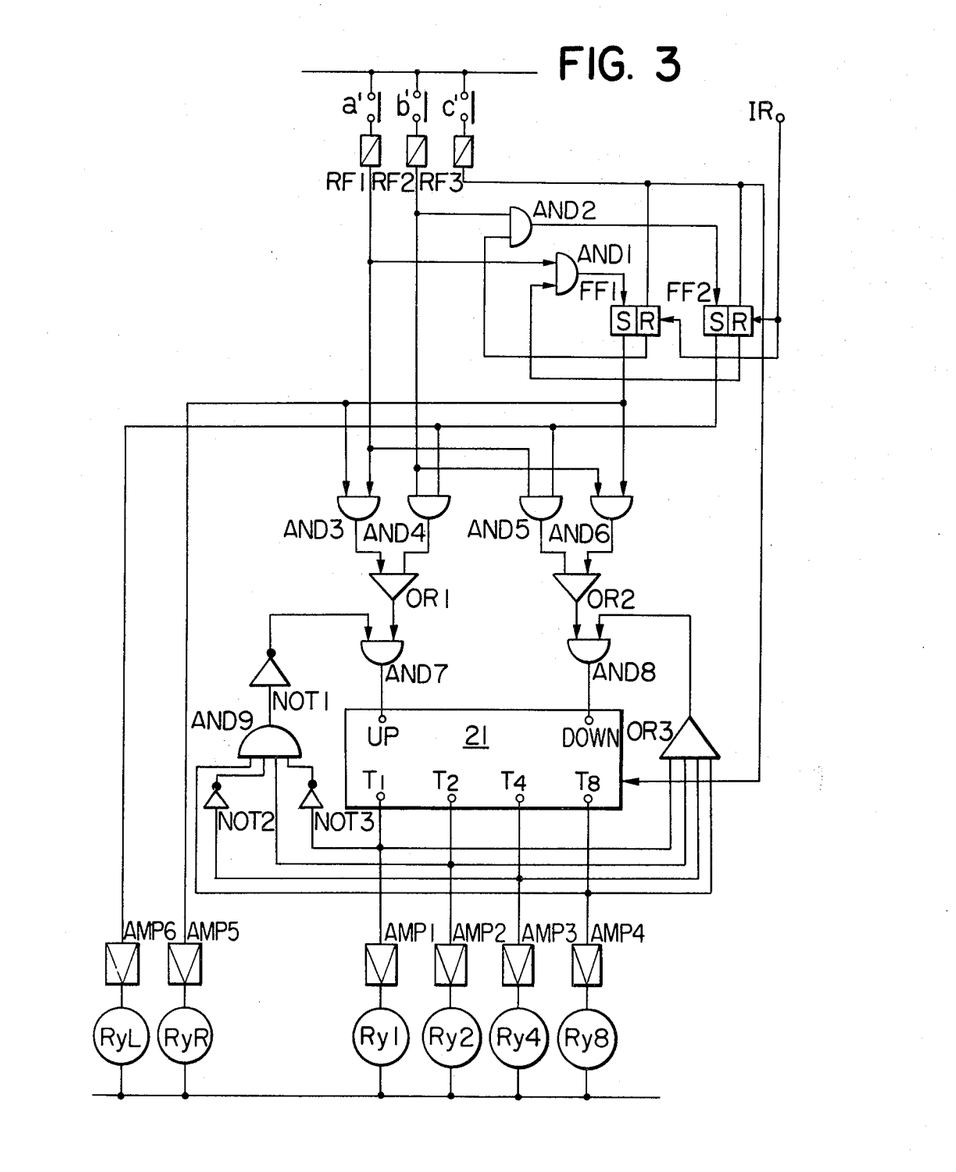
FIG. 3 is a block diagram of a bi-polar pulse generating circuit, a gate circuit and a reversible BCD counter incorporated in the device of FIG. 2.

FIG. 3 is a block diagram of the bi-polar pulse generating circuit 19, the gate circuit 20 and the reversible BCD counter 21.

The pulse generating circuit 19 is hereafter described. One input terminals of AND1, AND3 and AND5 are connected to an output terminal of RF1 to which a signal a' is to be fed. One input terminals of AND2, AND4 and AND6 are connected to an output terminal of RF2 to which a signal b' is to be fed. One R-input terminals of FF1 and FF2 and a reset terminal of the reversible BCD counter 21 are connected to an output terminal of RF3 to which a signal c' is to be fed. An initial reset terminal 1R is connected to the other R-input terminals of FF1 and FF2. The other input terminals of AND2 and AND1 are connected to R-output terminals of FF1 and FF2, respectively. Output terminals of AND1 and AND2 are connected to S-input terminals of FF1 and FF2, respectively. RyR is connected via other input terminals of AND3 and AND6 and AMP5 to the S-output terminal of FF1. RyL is connected via the other input terminals of AND4 and AND5 and an AMP6 to the S-output terminal of FF2. Output terminals of AND3 and AND4 are connected to an input terminal of OR1, and one input terminal of AND7 is connected to an output terminal of OR1. Output terminals of AND5 and AND6 are connected to input terminals of OR2, and one input terminal of AND8 is connected to an output terminal of OR2.

Output terminals T1,T2,T4 and T8 of the reversible BCD counter 21 are connected to input terminals of OR3, and an output of OR3 is fed to the other input terminal of AND8, thus forming a substraction gate circuit.

An addition gate circuit is hereafter described. Output terminals T2 and T8 of the reversible BCD counter 21 are connected to input terminals of AND9, and output terminals T1 and T4 of the counter 21 are connected via NOT3 and via NOT2, respectively, to input terminals of AND9. An output of AND9 is fed via NOT1 to the other input terminal of AND7, thereby forming an addition gate circuit. The addition gate circuit and the substraction gate circuit form the gate circuit 20.

OPERATION OF THE INVENTION

The operation will be described, on the assumption that the winch is steered to the right and to the left, the winch is stopped at No. 0 notch, and a speed of the winch is in the range of No. 1 to No. 10 notches in the circuit of FIG. 3.

The power source is thrown to the motor M for operating the fluid pump 1, and simultaneously therewith, a power-source-thrown signal is fed to the terminal IR. The signal from the IR resets the flip-flops FF1 and FF2 initially, and the outputs from FF1 and FF2 are fed to AND1 and AND2. With this situation the device waits for a winch-running-instruction signal.

Where it is desired to operate the winch in the rightward steering mode at a speed of No. 3 notch, the push button for rightward steering mode A of the radio-transmitter 17 is pressed three times. As a result, the relay a of the radio-receiver 18 is operated three times, where the contact a' of the relay a are rendered on and off three times. The instruction signal resulting from the above operation is transmitted via the voltage converting element RF1 and through the AND element AND1, when the relay a is rendered on at first, to the flip-flop FF1, and resets an output to the AND element AND2. At the same time, outputs are fed from FF1 to AND3 and AND6, and the output from FF1 excites the relay RyR through the relay driving element AMP5, thereby setting the relay in a direction to operate the winch in the rightward steering mode. Instruction signals generated three times pass through AND3, OR1 and AND7, and are fed as three pulses to the addition terminal UP of the reversible BCD counter 21.

Figure 4:
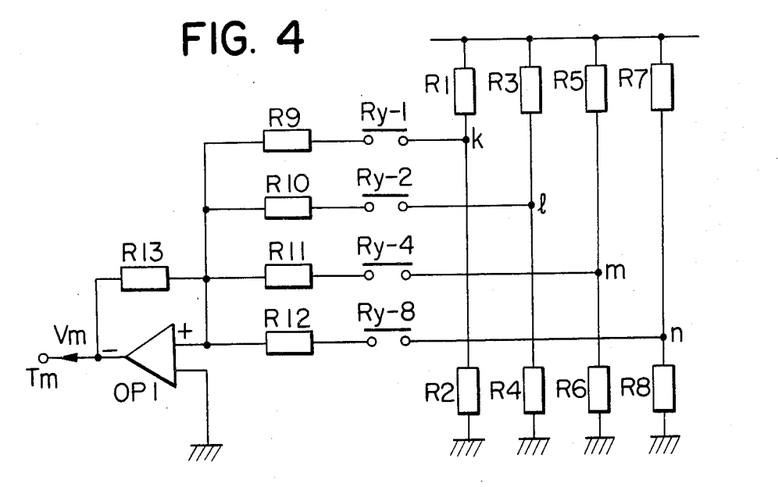
FIG. 4 is a block diagram of a D/A converting circuit of FIG. 2.
Figure 6:
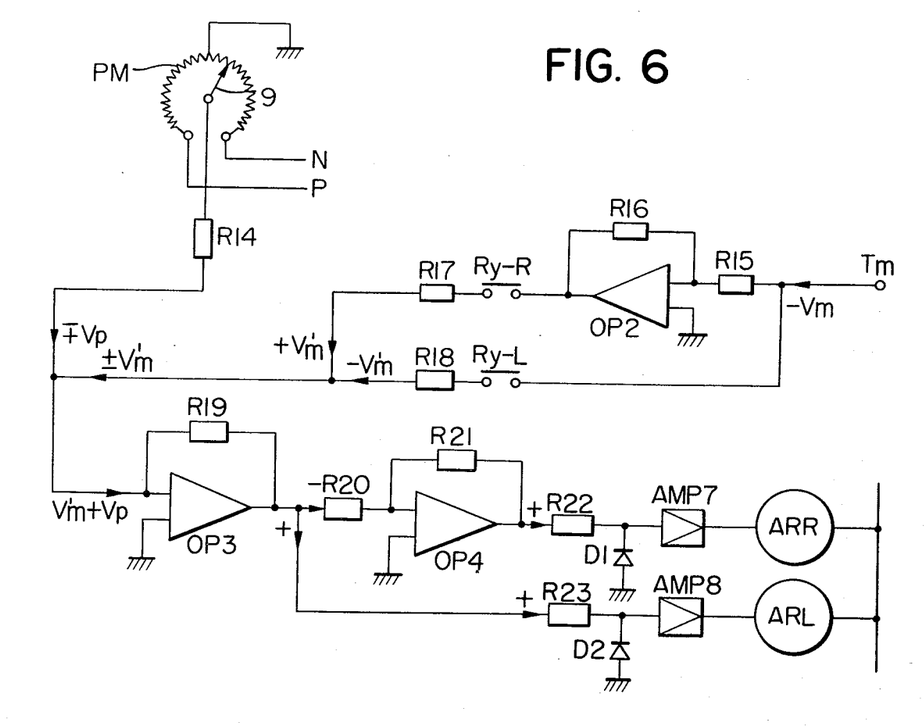
FIG. 6 is a block diagram of a comparison circuit, an electromagnetic change-over valve operating circuit and a relay of FIG. 2; and, FIG. 7 plots the relationship of the input of V'm+Vp versus operations of the relays ARR and ARL of FIG. 6.
Figure 7:
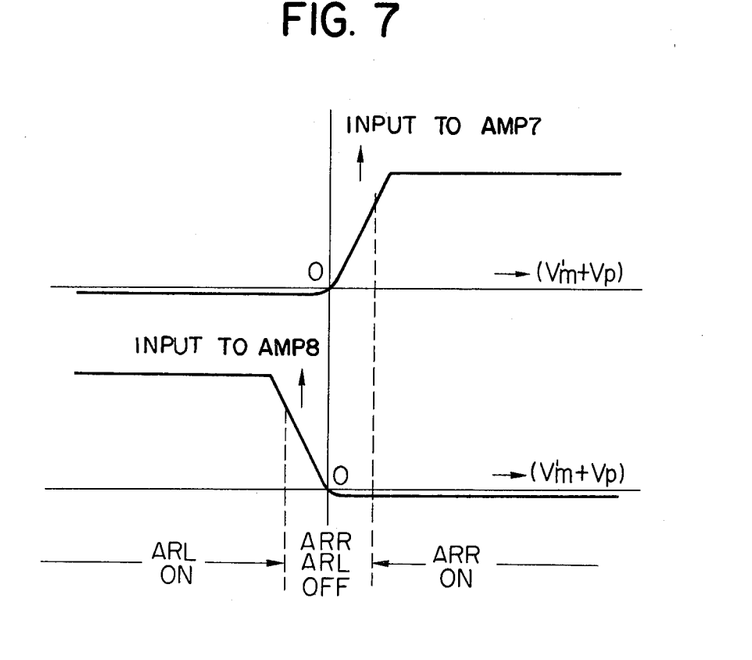

The reversible BCD counter 21 counts three pulses and generates outputs at the terminals T1 and T2, thereby actuating the relays Ry1 and Ry2 by way of relay actuating elements AMP1 and AMP2, respectively. Consequently, the solenoid SOL1 is operated through ARR1 by the D/A converting circuit 22, the comparison circuit 23 and the electromagnetic valve operating circuit 24 as shown in FIGS. 4 and 6, or the solenoid SOL2 is operated through ARL by these circuits. More in detail, the output is converted by the D/A converting circuit 22 into an analogue voltage corresponding to No. 3 notch (by the operation of Ry-1 and Ry-2); the analogue voltage Vm (an instruction voltage) is compared with a voltage at the potentiometer PM(a position voltage) Vp at the comparison circuit 23; the relay ARR and the solenoid SOL1 are excited until a level of analogue voltage Vm and that of position voltage Vp become equal to each other; and when both voltages become equal to each other, the winch is run at the speed of No. 3 notch.

When it is desired to decrease the speed of the winch to No. 2 notch during the running at the speed of No. 3 notch in the rightward steering mode, the push button B for the leftward steering mode of the radio-transmitter 17 is pressed once. By this operation, the contact $b'$ of the relay $b$ of the radio-receiver is goes to the "on" mode. The instruction signal resulting from this operation passes through the voltage converting element RF2 and through the AND element AND6, the OR element OR2 and the AND element AND8, and is fed as a single pulse to the subtraction terminal DOWN of the reversible BCD counter 21, whereby "1" is subtracted from the count "3" in the reversible BCD counter 21, and an output is generated at the terminal $T_2$. The output excites the relay Ry2 by way of the relay exciting element AMP2. Thus, by the D/A converting circuit 22, the comparison circuit 23 and the electromagnetic change-over valve operating circuit 24, the winch is moved to the right at the speed of No. 2 notch.

When the push button for the rightward steering mode A of the radio-transmitter 17 is pressed five times with the above situation maintained intact, the contact $a'$ of the relay $a$ of the radio-receiver 18 is repeatedly turned on and off five times. As a result, signals pass via the voltage converting element RF1 and through the AND element AND3, the OR element OR1 and the AND element AND7, and eventually five pulses are fed to the addition terminal UP of the reversible BCD counter 21, whereby the counter 21 counts seven pulses. The reversible BCD counter 21 then generates outputs at the terminals $T_1, T_2$ and $T_4$, whereby the relays Ry1,-Ry2 and Ry4 are excited by way of the relay actuating elements AMP1, AMP2 and AMP3. Consequently, the winch is run in the rightward steering mode at the speed of No. 7 notch by the D/A converting circuit 22, the comparison circuit 23 and the electromagnetic change-over valve operating circuit 24.

The count of pulses at the reversible BCD counter 21 is such that the number of pulses being fed via AND7 to the terminal UP of the counter 21 is added to the count of pulses at the counter; the number of pulses being fed to the DOWN terminal by way of AND8 is subtracted from the count of pulses at the counter; and the decimal number of the count of pulses is represented in the form of binary number, 4-bits and generated as outputs at the output terminals $T_1, T_2, T_4$ and $T_8$ of the reversible BCD counter 21. These outputs are cancelled by a signal $C'$ fed via RF3 to the reset terminal of the reversible BCD counter 21. Table 1 shows the relationship of the count of pulses counted at the reversible BCD counter 21 versus outputs at respective output terminals thereof.

TABLE 1

| Count of pulses | Reference numerals of terminals | | | |
|---|---|---|---|---|
| | 1 | 2 | 4 | 8 |
| 0 | 0 | 0 | 0 | 0 |
| 1 | 1 | 0 | 0 | 0 |
| 2 | 0 | 1 | 0 | 0 |
| 3 | 1 | 1 | 0 | 0 |
| 4 | 0 | 0 | 1 | 0 |
| 5 | 1 | 0 | 1 | 0 |
| 6 | 0 | 1 | 1 | 0 |
| 7 | 1 | 1 | 1 | 0 |

TABLE 1-continued

| Count of pulses | Reference numerals of terminals | | | |
|---|---|---|---|---|
| | 1 | 2 | 4 | 8 |
| 8 | 0 | 0 | 0 | 1 |
| 9 | 1 | 0 | 0 | 1 |
| 10 | 0 | 1 | 0 | 1 |

When it is desired to stop the winch during the running in the rightward steering mode at the speed of No. 7 notch, the stop button C of the radio-transmitter 17 is pressed. Consequently, the contact $c'$ of the relay $c$ of the radio-receiver 18 is turned on and the signal from the relay is fed via RF3 to the input terminals R of FF1 and FF2, whereby FF1 and FF2 are reset. FF1 cancels the outputs from the terminal S which are to be fed to AND3 and AND6, and at the same time renders the relay RyR off, thereby cancelling the output for the rightward steering mode. Simultaneously therewith, FF1 and FF2 feed outputs from the output terminals R to AND1 and AND2, for waiting for a succeeding instruction, and reset the reversible BCD counter 21, whereby outputs at respective output terminals $T_1, T_2, T_4$ and $T_8$ become zero. Consequently, the analogue voltage (an instruction voltage) Vm at the D/A converting circuit 22 becomes zero, and a positive position-voltage Vp of the potentiometer PM is fed to the comparison circuit. The output of the comparison circuit is fed to the electromagnetic change-over valve operating circuit 24, which in turn maintains the relay ARL conducting until the value Vp becomes zero, stated otherwise, until the winch is stopped.

In order to stop the winch, another means may be taken. The push button B for the leftward steering mode of the radio-transmitter 17 is pressed seven times, thereby feeding seven pulses to the DOWN terminal of the reversible BCD counter 21. Consequently, the reversible BCD counter 21 is cleared, and the outputs at respective output terminals $T_1, T_2, T_4$ and $T_8$ are cancelled. Thus, the D/A converting circuit 22, the comparison circuit 23 and the electromagnetic change-over valve operating circuit 24 are operated to stop the winch.

In order to run the winch in the leftward steering mode from the above situation, the stop button C is once pressed to reset FF1 and FF2, thereby cancelling the rightward steering mode. Thereafter, the push button for the leftward steering mode is pressed by the number corresponding to the number of desired notch. When the push button for the leftward steering mode B is pressed, the circuit FF2 is set at the first pulse and stores the leftward steering mode therein.

In this connection, it should be noted that the subtraction gate is provided. Unless the subtraction gate is provided, the following phenomenon would occur. When the pulses are sequentially fed to the DOWN terminal of the reversible BCD counter 21, the count of pulses at the reversible BCD counter 21 is subtracted one by one until the count becomes zero. When a succeeding one pulse is fed to the counter, the count becomes 15. Thereafter, "1" is subtracted from the count "15" every time one pulse is fed to the counter, with the failure to control the winch in the usual manner. To avoid the above-described phenomenon, the subtraction gate circuit is provided in the reversible BCD counter 21 according to the present invention. In the reversible BCD counter 21 including the subtraction gate circuit, if the count of pulses at the counter is "0", no output appears at any of the output terminals $T_1, T_2, T_4$ and $T_8$; no input is fed to OR3; and hence no input to AND8, whereas no input is fed from AND8 to the DOWN terminal of the reversible BCD counter 21. Subtraction over "0" from the count of pulses counted at the counter 21 is thus prevented. In the case where the count of pulses is not "0" but less than "15", then an output is generated at any of the output terminals $T_1, T_2, T_4$ and $T_8$ of the reversible BCD counter 21, and the output is fed via OR3 to AND8, thereby being fed to the DOWN terminal of the counter.

The addition gate circuit is provided in the counter 21, for preventing the following phenomenon. By sequential addition of pulses one by one to the UP terminal of the counter, the count of pulses at the reversible BCD counter 21 is increased to "15", and the count becomes "0" when a succeeding one pulse is fed thereto. Every time one pulse is fed to the counter 21, "1" is added to the count, thus the count being increased to 1,2,3,4 . . . with the failure to control the winch regularly.

To avoid such phenomenon, as well as to regulate the maximum count of pulses to "10", the addition gate circuit is provided in the reversible BCD counter 21 according to the present invention. The reversible BCD counter 21 including the addition gate circuit operates as follows. If the count of pulses is "10", no output is generated at any of the output terminals $T_1$ and $T_4$ of the counter 21 and outputs are generated at the output terminals $T_2$ and $T_8$ of the counter. The output of $T_1$ via NOT3, the output of $T_4$ via NOT2 and outputs of $T_2$ and $T_8$ are fed to AND9, thereby generating an output from AND9. When the output is fed to NOT1, no input is fed from NOT1 to AND7, and hence no input is fed to the UP terminal of the reversible BCD counter 21, so that in case the count is in excess of "10", no pulse is added. In the case of the count of pulses being in the range of 0 to 9, no output appears at AND9, and an output is generated at NOT1. The output of NOT1 is fed to AND7, whereas a signal is fed to the UP terminal.

In the circuit so far described, an instruction of operating the winch in the rightward steering mode or the leftward steering mode is given by actuating the relays RyR or RyL, and the relays Ry1,Ry2,Ry4 and Ry8 operate, in combination, to give a speed instruction for the winch.

Figure 5:
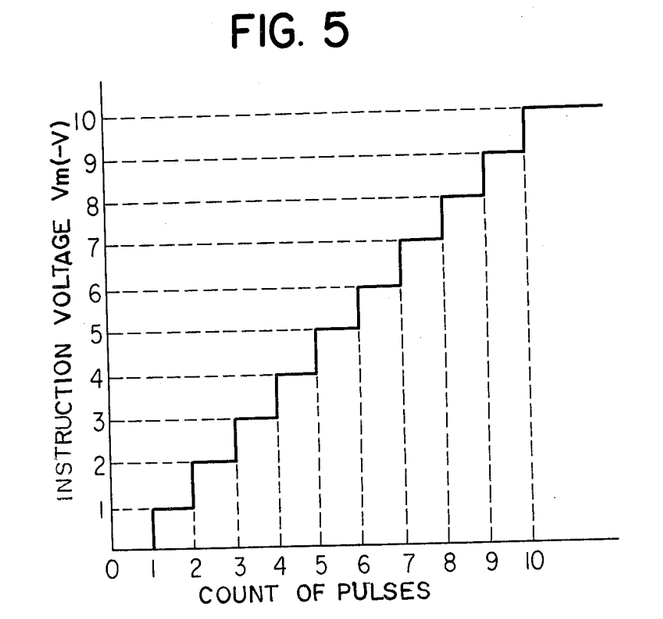
FIG. 5 is a graph representing the relationship of the number of pulses counted by the reversible BCD counter versus a voltage generated from the D/A converting circuit of FIG. 4.

FIG. 4 shows the D/A converting circuit. The contacts Ry-1,Ry-2,Ry-4 and Ry-8 are operated by the relays Ry1, Ry2, Ry4 and R8, respectively. Resistance values at resistors R1 through R8 are so determined that a voltage ratio at the points K, l, m and n is 1:2:4:8 under the condition in which the above-described respective contacts are all maintained off, and resistors R9 through R13 respectively have a resistance value as large as the electric potential at the points K, l, m and n do not fluctuate when respective contacts are rendered on. The contacts Ry-1,Ry-2,Ry-4, and Ry-8, the combination of which depends on the number of speed-instruction pulses, cooperate to apply a positive voltage to an operation amplifier OP1 as an input, and a negative instruction voltage Vm is generated at the terminal Tm. Resistance values of the resistors $R_1$ through $R_8$ are so determined that voltages at the points K, l, m and n are at 1,2,4 and 8 V, respectively, and the resistance values of resistors R9 through R13 are equal to each other. When an instruction of the speed of No. 3 notch is given, the bi-polar pulse generating circuit 19 and the reversible BCD counter 21 operate to render the contacts Ry-1 and Ry-2 on. Consequently, a voltage $+(1+2)V = +3$ $V$ is fed as an input to the operation amplifier OP1, and the instruction voltage $Vm = -3$ V is generated at the terminal Tm. The relationship of the instruction voltage Vm generated from the circuit versus the count of pulses counted by the rebersible BCD counter 21 is shown in FIG. 5.

FIG. 6 shows the comparison circuit and the electromagnetic change-over valve operating circuit. Resistors R14 through R23 respectively have a resistance value suited for a circuit constant, respectively. The potentiometer PM is so arranged as to generate a negative voltage in the rightward steering mode, a positive voltage in the leftward steering mode and position voltages Vp in the range of 1 to 10 V at the speed of Nos. 1 through 10 notches, and the outputs thereof are fed to the operation amplifier OP3.

The negative instruction voltage Vm fed to the terminal Tm is inverted at the operation amplifier OP2 in the case where the rightward steering mode is set, and the positive instruction voltage V'm is fed via the contact Ry-R of the relay RyR to the operation amplifier OP3. In the case where the leftward steering mode is set, the negative instruction voltage Vm is fed via the contact Ry-L of the relay RyL to the operation amplifier OP3, for the comparison and calculation.

If (V'm+Vp) is a positive value, then a negative output is generated at the operation amplifier OP3. The output is fed via a diode D2 to the operation amplifier OP4 and inverted to a positive output at the operation amplifier OP4. The positive output operates the relay ARR via the relay actuating element AMP7. If (V'm+Vp) is a negative value, a positive output is generated at the operation amplifier OP3, and the positive output operates the relay ARL via the relay actuating element AMP8, thereby operating the contacts AR-R and AR-L, whereby the solenoid SOL1 or SOL2 of the electromagnetic change-over valve 13 is excited. Consequently, a fluid pressure acts to operate the fluid pressure cylinder device 7, the rack 6, the pinion 5 and the control shaft 3, thereby moving the control element 2 to the instructed position. When the sliding element 9 interlocking with the control element 2 is located at a position of (V'm+Vp) $\approx 0$, then the contact AR-R or AR-L is rendered off, and the solenoid SOL1 or SOL2 becomes non-conducting, whereas the control element 2 is retained at that position, thus allowing the winch to run at the speed instructed.

Where it is desired to start the winch in the rightward steering mode at the speed of No. 3 notch, the push button for instruction of the rightward steering mode is pressed three times. By this operation, a voltage of $-3$ V is applied as an input to the terminal Tm by way of the pulse generating circuit 19, the gate circuit 20, the reversible BCD counter 21 and the D/A converting circuit 22, and inverted to the voltage of $+3$ V at the operation amplifier OP2. At the initial stage of the instruction in which the voltage passes the contact RY-R and is fed to the operation amplifier OP3, the control element 2 is positioned at a point of the speed of No. 0 notch, and the position voltage Vp of the sliding element 9 is "0" V, whereas (V'm+Vp)= +3 V is fed to the operation amplifier OP3 and the voltage of $-3$ V is generated from the operation amplifier OP3. Consequently, the output of +3 V is fed via the operation amplifier OP4 to the relay actuating element AMP7, thereby rendering the contact AR-R on, whereby the control element 2 is moved under the fluid pressure to a position for operating the winch in the rightward steering mode at a speed of No. 3 notch. In a position in which the position voltage of the sliding element 9 becomes substantially $-3$ V, stated otherwise, in a position in which the input of the operation amplifier OP3 is: (V'm+Vp)=0, the contact AR-R becomes off, and the control element is retained at the position of the speed of No. 3 notch, whereby the winch is operated in the rightward steering mode at the speed of No. 3 notch.

When it is desired to reduce the speed of the winch to the speed of No. 2 notch, the push button for the leftward steering mode of the radio-transmitter 17 is pressed a time, so that $-2$ V is applied to the terminal Tm. The instruction voltage V'm generated from the operation amplifier OP2 is $+2$ V, and the position voltage Vp is $-3$ V. Therefore an input to the operation amplifier OP3 is: V'm+Vp=$-1$ V, and the output from the operation amplifier OP3 is $+1$ V. This output renders the contact AR-L on by way of the relay actuating element AMP8, whereby the control element 2 is moved to a position in which the position voltage Vp is $-2$ V, namely, to a position of the speed of No. 2 notch.

In order to stop the winch, the push button C for stopping the winch, of the radio-transmitter 17 is pressed, or the push button for a reverse steering mode is pressed by the number corresponding to a desired speed notch. In the former case, the reversible BCD counter 21 is reset, and when the count of pulses becomes zero, namely, the instruction voltage Vm become "0" volt, then the contact Ry-R or Ry-L is rendered off. Consequently, the position voltage Vp alone is fed to the operation amplifier OP3, and the contact AR-R or AR-L is turned on, whereby the control element 2 is moved under a fluid pressure to a stop position, namely, to a position of No. 0 notch, whereby the position voltage Vp becomes zero, and the contact AR-R or AR-L is rendered off, thereby stopping the winch.

In the latter case, the contact Ry-R or Ry-L is maintained at the on-position, and the count of pulses at the reversible BCD counter 21 becomes zero. Thus, the instruction voltage Vm becomes "0" volt, so that the winch is stopped. In the foregoing, to move the winch in the rightward steering mode alone has been described. In the leftward steering mode, the winch is controlled in like manner as described above.

What is claimed is:

1. An electro-mechanical arrangement for driving a winch, comprising in combination:
   (a) actuating means (1) and a motor (M) for driving the actuating means (1);
   (b) a lever (4) coupled to the actuating means (1) for adjusting the actuating rate of said actuating means, a central shaft (3) with a pinion (5) thereon coupled to the lever (4);
   (c) a rack (6) operatively connected to the pinion (5), a piston rod (8) connected to the rack (6), with a piston (10) in a fluid pressure cylinder (7) defining first and second chambers (11, 12);
   (d) fluid pump means (14, 15) connected to said first and second chambers (11, 12) and first and second electric solenoid means for controlling the fluid flow to said first and second chambers (11, 12) to move said rack (6) and turn said pinion (5), first and second switch means to enable said first and second solenoid means, electrical resistance position means (9) coupled to said central shaft (3) giving the position of said shaft as an electrical value;
   (e) instruction means (17, 18), for positioning the winch, a pulse generator (19) responsive to said instruction means supplying pulses, counter means (21) counting the pulses, converter means (22), changing said pulses into an electric value, and comparison means (23) coupled to said converter means (22) and to said electrical resistance position means (9); and,
   (f) an operating circuit (24) coupled to said comparison means (23) driving said first and second switch means.

2. An arrangement claimed in claim 1 wherein said counter means (21) is a binary coded decimal counter with a subtraction gate and an addition gate to avoid ambiguity.

* * * * *